United States Patent [19]

Baldi

[11] 4,260,654

[45] Apr. 7, 1981

[54] SMOOTH COATING

[75] Inventor: Alfonso L. Baldi, Wynnewood, Pa.

[73] Assignee: Alloy Surfaces Company, Inc., Wilmington, Del.

[21] Appl. No.: 73,539

[22] Filed: Sep. 7, 1979

Related U.S. Application Data

[63] Continuation-in-part of Ser. No. 752,855, Dec. 21, 1976, Pat. No. 4,208,453, Ser. No. 809,189, Jun. 23, 1977, Ser. No. 851,504, Nov. 14, 1977, Ser. No. 963,313, Nov. 27, 1978, and Ser. No. 953,762, Oct. 23, 1978, each is a continuation-in-part of Ser. No. 614,834, Sep. 19, 1975, Pat. No. 4,140,760, said Ser. No. 752,855, Ser. No. 809,189, and Ser. No. 851,504, is a continuation-in-part of Ser. No. 694,951, Jun. 11, 1976, abandoned, said Ser. No. 614,834, is a continuation-in-part of Ser. No. 446,473, Feb. 27, 1974, Pat. No. 3,958,046.

[51] Int. Cl.$^3$ ............................................. C23C 9/02
[52] U.S. Cl. .................................. 427/253; 427/405; 204/385; 428/652
[58] Field of Search ............... 427/252, 253, 191, 405; 428/652; 204/385

[56] References Cited

U.S. PATENT DOCUMENTS

| 3,597,172 | 8/1971 | Bungardt et al. | 428/652 |
| 3,640,755 | 2/1972 | Barth | 427/405 |
| 3,640,815 | 2/1972 | Schwartz et al. | 427/252 |
| 3,859,061 | 1/1975 | Speirs et al. | 428/652 |
| 3,979,534 | 9/1976 | Rairden | 427/253 |

*Primary Examiner*—Ralph S. Kendall
*Attorney, Agent, or Firm*—Connolly and Hutz

[57] ABSTRACT

Roughening effect of low-temperature diffusion aluminizing of age-hardenable stainless steels, is offset by applying a nickel or cobalt plating not over 0.1 mil thick before the aluminizing.

6 Claims, No Drawings

SMOOTH COATING

This application is a continuation-in-part of applications Ser. No. 752,855 filed Dec. 21, 1976, (U.S. Pat. No. 4,208,453), Ser. No. 809,189 filed June 23, 1977, Ser. No. 851,504 filed Nov. 14, 1977, Ser. No. 963,313 filed Nov. 27, 1978 and Ser. No. 953,762 filed Oct. 23, 1978, each of which is in turn a continuation-in-part of application Ser. No. 614,834 filed Sept. 19, 1975 (now U.S. Pat. No. 4,140,760 granted Feb. 27, 1979) and the first three of which are also continuations-in-part of application Ser. No. 694,951 filed June 11, 1976 (subsequently abandoned). Application Ser. No. 614,834 is in turn a continuation-in-part of application Ser. No. 446,473, filed Feb. 27, 1974 (now U.S. Pat. No. 3,958,046, granted May 18, 1976).

The present invention relates to the aluminizing of age-hardenable stainless steels, more particularly to the aluminizing at relatively low temperatures.

Among the objects of the present invention is the provision of a novel aluminizing technique that provides a more desirable surface on aluminized age-hardenable stainless steels.

Additional objects of the present invention include the provision of aluminized age-hardenable stainless steel surfaces that are particularly smooth.

The foregoing as well as still further objects of the present invention will be more fully understood from the following description of several of its exemplifications.

Aluminizing of ferrous metals is widely practiced inasmuch as such treatment sharply increases the resistance of these metals to corrosion. Even stainless steels can have their corrosion resistance increased in this manner, and stainless steel gas turbine engines have long had their compressor blades diffusion aluminized to this end. U.S. Pat. Nos. 3,859,061 and 3,597,172 describe such an operation.

The aluminizing operation adds some thickness to the metal workpiece that is aluminized, and to keep the dimensional changes small the aluminizing is effected by diffusion, generally pack diffusion, as described in U.S. Pat. No. 3,859,061. Thus the industry generally calls for an aluminized case only about 0.2 to about 2 mils thick. Such cases increase the overall metal thickness only about 0.15 to about 1.5 mil—that is, about ¾ the thickness of the case itself. They also provide considerable corrosion protection even though their maximum aluminum content, at the outer stratum for instance, is about 50% or below.

Aluminizing by dipping in molten aluminum is not suitable for such purposes because it adds too much thickness as well as too much irregularity, and the outer stratum thus formed is entirely or almost entirely aluminum which does not have the strength or hardness of a ferrous metal. Gas turbine engine airfoils are designed to have the minimum dimensions that provide the desired strength, and some can have an overall thickness of less than 50 mils. Adding 2 mils to each face of such a small thickness takes the airfoil out of tolerance, and manufacturing the airfoil thinner to accomodate such heavy aluminizing weakens the airfoil excessively.

Such small airfoils not only have very close dimensional tolerances, but they are fitted very close to each other so that the gases being compressed by them have a very narrow path to move through. These gases also move at very high speed through the narrow paths, and it is accordingly very important that the airfoil surfaces defining the paths, be quite smooth. In some cases a smoothness of about 25 micro-inches is needed, although as much as 38 micro-inches can generally be tolerated.

Unfortunately the low-temperature diffusion aluminizing of age-hardenable stainless steels widely used in the foregoing airfoils causes their surfaces to become excessively rough. Thus such an airfoil which before aluminizing can have an 18 micro-inch roughness, becomes an aluminized airfoil with a roughness of 40 or more micro-inches. Similar roughening takes place when diffusion aluminizing workpieces containing other age-hardenable stainless steels such as 17-4 PH and those containing about 2 to 5% molybdenum.

It is not practical to try to smooth the surfaces after they have become roughened this way. For one thing any removal of surface metal by polishing reduces the thickness of the aluminized case and thus reduces the protection that the aluminizing was intended for.

Aluminizing at high temperatures, that is about 1200° F., causes less roughening, but is not desired inasmuch as the aluminizing is generally the last treatment of the workpiece at high temperatures, and aluminizing at a temperature above about 950° F. generally leaves the workpiece in need of additional heat treatment to improve its mechanical properties.

According to the present invention excessive roughening during low-temperature diffusion aluminizing is avoided without significantly detracting from the properties of the aluminized product, by preceding the aluminizing with the deposit on the surface to be aluminized, of a layer of a nickel or cobalt or mixtures of the two, not over about 0.1 mil thick. This is shown in the following examples.

EXAMPLE 1

A group of AM 355 last stage compressor blades about 9/16 inch wide, 2 inches long, and about 30 mils in thickness, for a J-85 jet engine, were cleaned by anodic treatment at 50 amperes per square foot in a 160°-180° F. water solution of sodium carbonate (1 oz./gal.) and sodium hydroxide (1 oz./gal.) for one minute, followed by water rinse and then a dip in 18% HCl.

After cleaning these blades showed a surface roughness of 17 to 20 micro-inches. They were given a four minute electro-plating treatment by applying a long magnet to the roots of a row of individual blades, immersing the airfoils of the blades so held in a solution of 426 g. of $NiCl_2.6H_2O$ and 70 cc. concentrated HCl in enough water to make one liter, and connecting the magnet as a cathode with respect to a nickel anode also immersed in the same solution. The cathode current density was 50 amperes per square foot, and the bath temperature about 27° C.

The electrolysis was then terminated, the plated blades were rinsed with water, dried and inspected. A bright coating was observed over the entire airfoil surfaces of the blades, and one of them on sectioning showed a nickel plate thickness of about 0.04 to about 0.09 mil. The remaining dried blades were then packed in a plain carbon steel diffusion-coating retort previously used for aluminizing. The packing was with a powder pack having the following composition by weight:

| | |
|---|---|
| Powdered aluminum - about 10 micron particle size | 20 parts |
| Powdered alumina - minus 325 mesh | 79.7 parts |
| Aluminum chloride, anhydrous | .3 parts |

The aluminum and alumina were in the form of a mixture that had been previously used as an aluminizing pack.

The packed retort was then placed in an outer retort as described in U.S. Pat. No. 3,801,357 and under the bathing action of hydrogen was heated to bring the pack to a temperature of 850° to 870° F. as measured by a thermocouple also inserted in the pack. The temperature was then maintained for 25 hours, after which the retorts were permitted to cool and the blades unpacked. As removed from the pack they showed a surface roughness from about 24 to about 30 micro-inches and presented a very good appearance.

One of the thus-treated blades was sectioned and examined microscopically. It showed an average aluminide case about 0.4 mil thick, the outer layer of the case having a high nickel structure that extended into the case about one-fifth the case depth. A salt-spray test showed a little better corrosion resistance for these treated vanes as compared with corresponding blades aluminized without the nickel plate. The ductility of the aluminized cases was about the same with the nickel plate as without it, as indicated by deforming such blades.

Additional AM 355 blades of the same type were subjected to the same sequence of treatment steps except that the electrolytic plating time was extended to 12 minutes. These showed that before aluminizing a nickel plate thickness of about 0.2 mil was deposited, and after aluminizing the case was much more brittle than the cases applied over the thinner nickel plating. This 0.2 mil nickel plate thickness is the minimum such thickness suggested in U.S. Pat. No. 3,859,061.

The nickel plating of the present invention can be applied by vapor deposition, or by ion deposition as described in U.S. Pat. No. 4,039,416 or in the Society of Automotive Engineers, Paper No. 730546, by Gerald W. White, entitled "Applications of Ion Plating" or by sputtering as described in the paper RF Sputtering by the same author and presented at the 8th Annual FAA International Aviation Maintenance Symposium, Oklahoma City, Okla., Nov. 28, 1972. Electroless plating can also be used with somewhat poorer results, inasmuch as the electroless platings contain phosphorus or boron or the like. The minimum suitable nickel plating thickness is about 0.01 mil.

The aluminizing can be effected with the workpieces embedded in a diffusion-coating pack as shown above, or with the workpieces kept out of contact with, but adjacent to the pack. The lowest practical aluminizing temperature is about 700° F., and other activators can be used in place of the aluminum chloride.

EXAMPLE 2

The processing of Example 1 is repeated with the following changes:

The activator is anhydrous aluminum bromide instead of the aluminum chloride.

The diffusion-bathing atmosphere is argon rather than hydrogen.

The initial cleaning of the blades was by solvent degreasing in place of the anodic electrolytic cleaning.

The aluminizing is conducted at 880°-900° F. to yield a case about 0.7 mil thick.

The surface roughness after aluminizing is about 28 to 35 micro-inches. Other cleaning steps such as simple glass blasting can also be used with similar results.

EXAMPLE 3

The processing of Example 1 is repeated but $CoCl_2.6H_2O$ was substituted for the $NiCl_2.6H_2O$ of Example 1, the quantity being unchanged. The resulting aluminized vanes have a surface roughness about the same as the Example 1 products, and showed even greater resistance to corrosion.

EXAMPLE 4

The processing of Example 1 is repeated but AM 350 airfoils are used, the nickel chloride is replaced by a mixture of 107 g. $NiCl_2.6H_2O$ and 107 g. $CoCl_2.6H_2O$, the HCl content of the electroplating solution is increased 50%, the cathodic electroplating current density is 100 amperes per square foot, the electroplating temperature is 35° C., and the electroplating time 2 minutes. The roughness of the final product is only about 5 to 10 micro-inches more than the untreated airfoils.

The aluminized blades can be used with or without the top coatings described in U.S. Pat. Nos. 3,859,061, 3,958,046, 3,948,687, 3,764,371 and 4,141,760. These top coatings after drying and firing generally provide a surface somewhat smoother than that of the surface on which they are applied. Thus a top coating containing leafing aluminum as described in column 6 of U.S. Pat. No. 3,958,046, applied as a 0.3 milligram per square centimeter layer over the aluminized product of Example 1 in the present specification and fired at 700° F., improves the smoothness by about 2 to 5 micro-inches. Such a top coating over a rougher similarly aluminized workpiece which did not have the thin nickel electroplate, brought the top smoothness down to close to 30 micro-inches.

Increasing the number of top coating layers on the workpiece further improves the smoothness, but will generally not get the smoothness much below about 24 micro-inches. A series of three layers of the above-noted flake aluminum coating on the product of Example 1 builds up the total top coating weight to 0.8 to 0.9 milligrams per square centimeter and shows a surface roughness as low as about 20 micro-inches.

Some top coating formulations when cured form hydrophobic surfaces over which it is difficult or impossible to apply a uniform overlying layer. The teflon-containing formulations of U.S. Pat. No. 3,948,687 are examples of such difficult materials. However top coatings that contain at least about 5% leafing aluminum by weight, or contain at least about 0.1% by weight wetting agent not destroyed or driven off by a curing operation, will accept overlying coatings fairly well.

One type of coating seems unique in that when applied over a top coating containing flake aluminum, has an exceptional smoothing effect. Thus an aqueous dispersion of colloidal silica containing 14% of the silica, and also containing 15% of a bonding agent such as magnesium chromate or mixtures of magnesium phosphate and magnesium chromate or such mixtures that also contain a little free phosphoric or chromic acid, when applied over other top coatings or other layers of the same top coating, will get the smoothness down to 10 to 15 micro-inches. Such a smoothness does not appear obtainable from other top coating layers regardless of how many are applied.

Thus an improvement of 14 micro-inches is obtained when coating an unaluminized Type 304 stainless steel compressor blade having an original roughness of 42 micro-inches after glass bead blasting to clean it, using the following coating treatment:

EXAMPLE 5

(a) Spray on the blade surface a suspension of the aluminum paste of Example I in U.S. Pat. No. 3,318,716 dispersed in 30 times its weight of a 4% water solution of $MgCrO_4$, the coating residue after drying weighing about 0.25 milligrams per square centimeter.

(b) Dry and then bake the coated blade at 700°–800° F. for 10 minutes.

(c) Repeat steps (a) and (b) on the baked blade.

(d) Repeat steps (a) and (b) again.

(e) Spray on the resulting coated blade a 5% suspension of colloidal alumina in the teflon free magnesium phosphate-chromate acid solution of Example II in U.S. Pat. No. 3,948,687, the alumina particles having a particle size below 10 millimicrons, to leave a stratum that after drying weighs about 0.6 milligram per square centimeter.

(f) Repeat the drying and baking step (b).

(g) Repeat step (e) on the thus baked blade.

(h) Repeat the drying and baking.

(i) Repeat step (e) again.

(j) Repeat the drying and baking.

The final coated blade shows a roughness of about 28 micro-inches and makes a very effective compressor blade for jet engines.

This exceptional top smoothness is provided by dispersions containing about 1 to 20% of silica or alumina particles no larger than about 25 millimicrons in size and a water-soluble bonding agent in an amount at least equal to that of the dispersed particles. However magnesium chromate is a particularly desirable bonding agent inasmuch as it has strong corrosion-inhibiting effects on a metal workpiece it covers. As much as half the magnesium chromate can be replaced by magnesium phosphate and/or chromic acid and/or phosphoric acid. The hardness and mar-resistance of aluminum flake coatings is also markedly increased by such colloidal over-coatings.

The foregoing smoothing effect of top coatings is provided on other substrates such as on type 410 stainless steel airfoils that have been aluminized without the help of the thin nickel or cobalt flash electroplate, but such electroplates at least 0.01 mil thick make for a much smoother product on age-hardenable stainless steels.

The compositions of AM 355 as well as of other typical age-hardenable steels suitable for the present invention is given below, taken from ASTM Data Series Publication No. DC 9d, October 1967.

| Alloy | C | Mn | Si | Cr | Ni | Co | Mo | W | Cb | Ti | Al | B | Zr | Fe | Other |
|---|---|---|---|---|---|---|---|---|---|---|---|---|---|---|---|
| GROUP 1 FERRITIC (MARTENSITIC) STEELS — Nominal Chemical Composition, percent ||||||||||||||||
| Age-Hardening Stainless Steels ||||||||||||||||
| AM-350 | 0.10 | 1.00 | 0.40 | 16.50 | 4.25 | — | 2.75 | — | — | — | — | — | — | Bal. | — |
| AM-350 | — | — | — | — | — | — | — | — | — | — | — | — | — | — | — |
| AM-355 | 0.15 | 1.00 | 0.40 | 15.50 | 4.25 | — | 2.75 | — | — | — | — | — | — | Bal. | 0.10N |
| AM-355 | — | — | — | — | — | — | — | — | — | — | — | — | — | — | — |
| AM-363 | 0.04 | 0.15 | 0.05 | 11.00 | 4.00 | — | — | — | — | 0.25 | — | — | — | Bal. | — |
| 15-5PH | 0.04 | 0.30 | 0.40 | 15.00 | 4.60 | — | — | — | 0.25 | — | — | — | — | Bal. | 3.30Cu |
| 17-4PH | 0.04 | 0.30 | 0.60 | 16.00 | 4.25 | — | — | — | 0.25 | — | — | — | — | Bal. | 3.30Cu |
| 17-7PH | 0.07 | 0.50 | 0.30 | 17.00 | 7.10 | — | — | — | — | — | 1.10 | — | — | Bal. | — |
| 17-7PH | — | — | — | — | — | — | — | — | — | — | — | — | — | — | — |
| PH13-8 Mo | 0.04 | 0.05 | 0.05 | 12.75 | 8.10 | — | 2.2 | — | — | — | 1.10 | — | — | Bal. | — |
| PH14-8 Mo | 0.04 | 0.30 | 0.40 | 14.35 | 8.15 | — | 2.2 | — | — | — | 1.10 | — | — | Bal. | — |
| PH15-7 Mo | 0.07 | 0.50 | 0.30 | 15.10 | 7.10 | — | 2.2 | — | — | — | 1.10 | — | — | Bal. | — |
| Pyromet X-15 | 0.03 | 0.10 | 0.10 | 15.00 | — | 20 | 3.0 | — | — | — | — | — | — | Bal. | — |
| AFC-77 | 0.15 | — | — | 14.50 | — | 13 | 5.0 | — | — | — | — | — | — | Bal. | 0.40V |
| Stainless W | 0.12 | — | — | 17.00 | 7.00 | — | — | — | — | $1.0^c$ | $1.0^c$ | — | — | Bal. | 0.2N |
| Illium P | 0.20 | 0.75 | 0.75 | 28.00 | 8.00 | — | 2.25 | — | — | — | — | — | — | 56.8 | 3.25Cu |
| Illium PD | 0.10 | 0.75 | 0.75 | 26.00 | 5.00 | 6.5 | 2.25 | — | — | — | — | — | — | 58.0 | — |

$^a$For rupture in 100 and 1000 hr. Not for design purposes.
$^b$Cast alloy.
$^c$Maximum.
$^d$Experimental alloy.
$^e$Alloy known not to be in commercial production.

When a stainless steel workpiece is to be aluminized, a very effective pre-cleaning is accomplished by the following sequence.

EXAMPLE 6

First subject the workpiece to ½ minute cathodic treatment at about 50 amperes per square foot in a 10% solution of sodium carbonate in water, then anodically treat it in the same solution at about the same current density for about the same time, after which the workpiece is rinsed with water, dipped in 10% NaOH solution in water to remove any residual smut, then in cold 1:1 concentrated HCl diluted with water, followed by another water rinse.

The resulting cleaned workpiece with a surface roughness of about 18 micro-inches is ready for plating in an acid nickel salt bath to a pick-up of about ½ milligram per square centimeter producing a nickel flash about 0.07 mil thick. After rinsing and drying it can then be aluminized in the powder pack of Example 1 for 30 hours at 870° to 890° F. to yield an aluminized case about 0.7 mil thick and having a surface roughness of about 22 to 23 micro-inches.

The aluminizing step in the above examples can be effected in very short times by heating a workpiece embedded in an activated powder pack, with a thermal input that brings it to diffusion coating temperature and completes the diffusion coating all in about 50 minutes or less. During this short interval the activator present in pack begins to be volatilized at a relatively rapid rate that persists about 45 minutes, even if only present in the pack at a concentration of 0.5% by weight, and the formation of the diffusion coating case is extremely rapid. Thus a 2 mil aluminized case is produced only about 30 minutes after starting to heat a workpiece to 1800° F. in a pack of

| 10 weight percent | Aluminum powder about 100 microns in size |
|---|---|
| 45 weight percent | Chromium powder about 10 microns in size |
| 50 weight percent | Al₂O₃ about 100 microns in size | with 0.5% NH₄Cl mixed in based on the weight of the pack, if the workpiece reaches 1800° F. in 15 minutes.

It is preferred to have the workpiece covered by no more than about ½ inch of activated pack when it is heated, inasmuch as the pack acts as thermal insulation and slows down the penetration of the heat to the workpiece from the walls of the retort in which it is held during the heating. With the workpiece embedded in a pack held in a cylindrical retort having a 7 inch length and a 2 inch diameter, so that about ½ inch pack thickness envelopes the workpiece, heat supplied at the rate of at least about 200,000 BTU per hour per pound of workpiece will effect the desired heat-up to temperatures as high as 1800° F. During such heat-up the retort can have one or both its ends loosely covered to permit escape of gases, and can be held in a larger retort through which hydrogen or argon is flowed at a slow rate to flush out the escaping gases.

It is not necessary to arrange the workpiece so that it comes to within ¼ inch of the retort as described in U.S. Pat. No. 3,824,122. Indeed the presence of a ½ inch thick pack covering is preferred when practicing the rapid diffusion coating of the present invention inasmuch as it assures the presence of sufficient energizer even when the energizer content of the pack is only 0.5% or less by weight. The energizer content can be increased, for example to 1%, but this increases the amount of gas generated during the heat and is not desirable.

A retort packed in accordance with the rapid diffusion coating technique of the present invention, can contain a number of workpieces and there is no need to position each workpiece into its own carefully dimensioned closely fitting retort as in U.S. Pat. No. 3,824,122.

Low temperature diffusion coating, as in Example 1, is even more readily accomplished in short periods of time—not over 45 minutes of heating is generally needed to bring the workpieces to temperature and obtain an aluminized case at least 1 mil thick. Thinner cases require only about 30 minutes or even less.

To further save time the retort cooling is best effected by withdrawing it from the furnace in which the heating is carried out. Exposed to the ambient air and with the help of the flushing gas stream between the retorts, the cylindrical retort assembly described above cools in about 15 minutes to the point that the outer retort can be opened and the inner retort withdrawn, exposed to the atmosphere and emptied. In this way the entire diffusion coating sequence including the completion of the cool-down takes only about an hour or 65 minutes. This compares with the 1½ hours disclosed in U.S. Pat. No. 3,824,122 for just the heating time. The cool-down can also be accelerated by blowing air over the cooling retort assembly or by lowering it into a quenching liquid such as water.

Obviously many modifications and variations of the present invention are possible in the light of the above teachings. It is, therefore, to be understood that within the scope of the appended claims the invention may be practiced otherwise than as specifically described.

What is claimed:

1. In the diffusion aluminizing of an age-hardenable stainless steel at a temperature below 1200° F., the improvement according to which roughening of the aluminized surface is reduced by applying to the stainless steel surface, before the aluminizing, an adherent layer of nickel or cobalt not over about 0.1 mil thick.

2. The combination of claim 1 in which the ferrous metal is AM-355.

3. The combination of claim 1 in which the layer of nickel is applied by electroplating.

4. The combination of claim 1 in which the aluminizing forms an aluminum-enriched diffusion case at least about 0.2 mil thick.

5. In the diffusion aluminizing and subsequent top coating of an age-hardenable stainless steel gas turbine airfoil, the improvement according to which the aluminizing is effected at not over about 950° F., roughening of the aluminized case is reduced by applying to the stainless steel surface before the aluminizing an adherent layer of nickel or cobalt not over about 0.1 mil thick, and the top coated product has a surface roughness of not over about 24 micro-inches.

6. In the diffusion aluminizing and subsequent top coating of an age-hardenable stainless steel gas turbine airfoil, the improvement according to which the aluminizing is effected at not over about 950° F., roughening of the aluminized case is reduced by applying to the stainless steel surface before the aluminizing an adherent layer of nickel or cobalt not over about 0.1 mil thick, the aluminized surface is subsequently top coated with a first stratum of aluminum flakes dispersed in a vehicle, and a top stratum of a dispersion of silica particles no larger than about 25 millimicrons in water containing a magnesium chromate binder for those particles, and the strata are cured to leave the completely coated surface with a roughness no greater than about 28 micro-inches.

* * * * *